(12) United States Patent
Spinella et al.

(10) Patent No.: US 11,967,902 B2
(45) Date of Patent: Apr. 23, 2024

(54) CONVERTER FOR TRANSFERRING ELECTRIC POWER TO AN ELECTRICAL LOAD

(71) Applicant: EGGTRONIC ENGINEERING S.P.A., Modena (IT)

(72) Inventors: Igor Spinella, Modena (IT); Alberto Michele Difrancesco, Modena (IT); Andrea Zanetti, Cento (IT); Filippo Muccini, Prignano Sulla Secchia (IT)

(73) Assignee: EGGTRONIC ENGINEERING S.P.A., Modena (IT)

( * ) Notice: Subject to any disclaimer, the term of this patent is extended or adjusted under 35 U.S.C. 154(b) by 251 days.

(21) Appl. No.: 17/615,681

(22) PCT Filed: May 25, 2020

(86) PCT No.: PCT/IB2020/054934
§ 371 (c)(1),
(2) Date: Dec. 1, 2021

(87) PCT Pub. No.: WO2020/245699
PCT Pub. Date: Dec. 10, 2020

(65) Prior Publication Data
US 2022/0255430 A1 Aug. 11, 2022

(30) Foreign Application Priority Data
Jun. 4, 2019 (IT) .................. 102019000007974

(51) Int. Cl.
*H02M 3/158* (2006.01)
*H02M 1/00* (2006.01)

(52) U.S. Cl.
CPC ......... *H02M 3/158* (2013.01); *H02M 1/0058* (2021.05)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 7,286,373 B1 * 10/2007 Liu .................... H02M 3/01
363/16
9,106,141 B2 * 8/2015 Hosotani ........... H02M 3/33576
(Continued)

FOREIGN PATENT DOCUMENTS

WO 2013150352 A1 10/2013
WO 2020065426 A1 4/2020

*Primary Examiner* — Jeffrey A Gblende
(74) *Attorney, Agent, or Firm* — Browdy and Neimark, PLLC

(57) ABSTRACT

A converter (145) is described comprising: a first input terminal (150) and a second input terminal (155), a first output terminal (165) and a second output terminal (170) connectable to opposite ends of the electrical load (110), a first electric branch (201) adapted to connect the first input terminal (150) with a first intermediate electrical node (202), a second electric branch (203) adapted to connect the first intermediate electrical node (202) with the second input terminal (155), a third electric branch (205) adapted to connect the first output terminal (165) with a second intermediate electrical node (206), a fourth electric branch (207) adapted to connect the second intermediate electrical node (206) with the second output terminal (170), a first active switch (180) placed on the second electric branch (203) and having a first conduction terminal (185) and a resonant circuit (200) sized to reduce the electric voltage and/or electric current applied to said first active switch at least in the moments wherein said first active switch (180) switches from the cut-off condition to the saturation condition, wherein said resonant circuit (200) comprises at least: a first resonance inductor (215) placed on the first electric branch
(Continued)

(201), a second resonance inductor (235) placed on the third electric branch (205), and a first resonance capacitance (220, 285, 290), wherein the first resonance inductor (215) and the second resonance inductor (235) are inductively coupled together with a reciprocal coupling factor less than 1.

12 Claims, 9 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/0058; H05B 39/048; B23K 11/24; H04B 2215/069

See application file for complete search history.

(56) References Cited

U.S. PATENT DOCUMENTS

| | | | |
|---|---|---|---|
| 10,804,798 B1 * | 10/2020 | Rizzolatti | H02M 3/33573 |
| 2002/0030451 A1 * | 3/2002 | Moisin | H05B 41/2851 |
| | | | 315/219 |
| 2016/0322910 A1 | 11/2016 | Kovacevic et al. | |
| 2018/0109174 A1 | 4/2018 | Angkititrakul et al. | |

* cited by examiner

CONVERTER FOR TRANSFERRING ELECTRIC POWER TO AN ELECTRICAL LOAD

TECHNICAL FIELD

The present invention relates to a converter for transferring electric power to an electrical load. The electrical load can be any electric or electronic device that must be electrically powered to allow its operation and/or to charge the internal batteries of the device itself. Classic examples of this type of electric/electronic device include, but are not limited to, smartphones, computers, laptops, tablets, televisions, appliances, home automation systems, servers and many other related devices.

PRIOR ART

A currently very widespread solution for transferring electric power to an electrical load is to use a converter, that is, an electric circuit configured so as to convert an input voltage into an output voltage adapted to supply the load.

For example, AC/DC converters are known which are adapted to convert an alternating voltage into a direct voltage, as are DC/AC converters adapted to convert a direct voltage into an alternating voltage and also DC/DC or AC/AC converters adapted to convert a direct/alternating voltage into another direct/alternating voltage but having different characteristics.

To ensure greater safety in use and sturdiness, all these converters can be made according to an isolated configuration, i.e. they can comprise a primary electric circuit adapted to receive the input voltage and a secondary electric circuit connected to the electrical load, which are galvanically isolated with respect to each other.

The primary circuit can comprise a wave generator, that is, in a switching-type electric circuit adapted to create high-frequency voltage waves, while the secondary circuit can possibly comprise a rectification stage adapted to convert these voltage waves into a continuous or substantially continuous voltage to be applied to the load.

A typical implementation of this solution is represented by the flyback-type AC/DC converter, in which the galvanic isolation is obtained by means of a transformer which allows an electromagnetic coupling between the primary circuit and the secondary circuit. The flyback-type circuit is basically a variant of the buck-boost type DC/DC converter, in which the energy storage inductor is replaced by the transformer.

This type of circuit has the advantage of being particularly simple and inexpensive but has many disadvantages due to the fact that it is a hard switching converter.

A hard switching converter is a circuit equipped with a switch whose switching from on to off and vice versa occurs when the current and/or the voltage applied to the switch are very different from zero, with the consequence of generating huge dynamic losses, also called switching losses, which in turn limit the maximum operating frequency of the system, causing large dimensions and low operating efficiencies.

Over the years this circuit has been refined by quasi-resonance techniques, useful for switching the switch in relatively low voltage conditions, as well as active clamping techniques on the primary circuit and synchronous rectification on the secondary circuit, useful for reducing losses.

All these arrangements, however, have the disadvantage of generating a high circuit complexity, which is accompanied by a high component cost and the introduction of maximum frequency limits due to the real-time control of the active components.

Another strategy to galvanically isolate the primary circuit from the secondary circuit of a converter is to separate them by means of a pair of isolation capacitances, which realise a capacitive coupling capable of transmitting electric power.

There are many advantages of capacitance-isolated converters, which mainly consist in the possibility of greatly reducing the overall dimensions, thanks to the elimination of the transformer and the possibility of increasing the operating frequencies (for example, reaching hundreds of kHz, MHz, tens of MHz or hundreds of MHz).

A further advantage of these capacitance-isolated converters lies in the fact that they can reach a higher operating efficiency, which remains typically stable both for light electrical loads and heavy electrical loads, instead of a generally low efficiency with peaks of efficiency only for certain determined load intervals, as typically occurs in transformer-isolated converters.

Typical examples of this type of converter are those based on resonant circuit diagrams, for example based on resonant D, E, F, E/F, $E^{-1}$, $F^{-1}$ class circuits or similar.

This type of circuit allows drastically reducing the dynamic losses in the active components (switches, for example MOSFETs), as well as the electromagnetic emissions (EMI), and considerably increasing the maximum operating frequency of the circuit, to the benefit of the overall dimensions, weight and costs.

An example of a resonant circuit, which is used in a converter isolated by capacitive coupling, is illustrated in the international patent application WO2013150352.

This circuit is practically a derivative of a class E or similar amplifier, in which the isolation capacities are exploited as resonance capacities of the LC resonator.

The circuit has innumerable advantages, especially its high operating efficiency and low dynamic losses due to the possibility of obtaining the Zero Voltage Switching and/or Zero Current Switching types of the active switch.

The low dynamic losses also allow considerably increasing the operating frequency, also reducing the overall dimensions compared to the traditional transformer-based flyback converter.

One of the few drawbacks of this architecture is represented by the need to place a choke inductor of great value between the supply voltage of the circuit and the active switch. This choke inductor should have a theoretically infinite value, in order to behave substantially as a current generator, which is charged, during the time interval in which the switch is on, and is discharged by powering the circuit with a roughly constant current, during the time interval in which the switch is turned off.

Clearly, in real circuits the choke inductor does not have an infinite value but it is nevertheless very large and, therefore, characterised by high dimensions.

Similar dimensions characterise the output filter inductor typically located downstream of the secondary rectifier stage, this component also having an ideally infinite value.

Another critical component in this category of circuit is the resonant inductor in series with the isolation capacitance, typically having high inductive value, useful also to compensate for the small isolation capacitance that is necessary to guarantee low touch currents (also known as leakage currents).

The high inductive value, the high operating frequency and the high current ripple (substantially sinusoidal current), make the aforementioned resonance inductor the source of almost all the losses of this type of circuit, which are especially realised in losses due to eddy phenomena in the core of magnetic material, such as for example magnetic hysteresis and eddy currents, and in the electric wire wound inside it, such as for example the skin effect, the Joule effect and proximity phenomena.

To address this drawback, the solution has been proposed to replace the choke inductor with a resonance inductor able to resonate with the isolation capacitances.

An example of this solution is described in Italian patent application no. 102018000008935.

This circuit allows exploiting the only inductor present on the primary circuit, both as a choke inductor that stores energy during the turning-on period, and as a resonance inductor during the turning-off period, thereby significantly reducing the total inductance value of the circuit and consequently decreasing the overall dimensions and increasing efficiency.

A further evolution of this solution, also described in the aforementioned Italian patent application no. 102018000008935, envisages providing a further resonance inductor on the secondary circuit which is able to simultaneously act as an output filter reducer and resonate with the isolation capacitances and with the resonance inductor placed on the primary circuit.

In this way, the total resonance frequency of the circuit depends on the sum of the primary and secondary resonance inductances and on the isolation capacitance series.

In addition to the advantage of compactness, given the elimination of cumbersome inductive components, this circuit also has the advantage of being able to have a further effect of cancellation of the isolation capacitances and, therefore, greater power transferred to the load at the same frequency and size of the isolation capacitances.

A disadvantage of this circuit lies however in the high peak voltages supported by the switches and in the high reactive currents circulating in the circuit, in particular in the inductors, which are the source of losses which, although lower than traditional circuits, represent almost all of the losses in the converter.

A further disadvantage is the need to provide two resonance inductors, which are typically characterised by a lower inductance/volume ratio than choke inductors.

In fact, the highest peak-to-peak currents that discharge on the resonance inductors involve a greater presence of eddy phenomena such as hysteresis, skin effect and proximity effect, which are typically minimised by lowering the relative permeability of the core of magnetic material (even using air gaps, materials based on nanopowders of ferromagnetic material at high frequencies, and therefore similar to distributed gap inductors, or air-wrapped inductors) and therefore increasing the size of the inductors.

These disadvantages can be mitigated by a similar circuit but realised in a push-pull configuration, which however requires the doubling of the number of components and is therefore adoptable only in cases of high output power, where dimensions and costs are less important with respect to lower power circuits.

DISCLOSURE OF THE INVENTION

In light of the above, an object of the present invention is to provide a solution which allows solving, or at least substantially reducing, the aforementioned drawbacks of the prior art.

Another object is that of achieving such objective within the context of a simple, compact, rational and as low-cost as possible solution.

These and other objects are reached by the characteristics of the invention as set forth in the independent claim 1. The dependent claims outline preferred and/or particularly advantageous aspects of the invention.

In particular, one embodiment of the present invention provides a converter for converting electric power to an electrical load, comprising:
  a first input terminal and a second input terminal, between which it is possible to apply a direct or similar electric voltage to a direct electric voltage,
  a first output terminal and a second output terminal connectable to opposite ends of the electrical load,
  a first electric branch adapted to connect the first input terminal with a first intermediate electrical node,
  a second electric branch adapted to connect said first intermediate electrical node with the second input terminal,
  a third electric branch adapted to connect the first output terminal with a second intermediate electrical node,
  a fourth electric branch adapted to connect said second intermediate electrical node with the second output terminal,
  a first active switch (e.g. MOSFET or other transistor) placed on the second electric branch and having a first conduction terminal connected to the first intermediate electrical node, a second conduction terminal connected with the second input terminal, and a control terminal adapted to receive an electric driving signal to switch the first active switch between a saturation condition, wherein it allows the passage of electric current between the first and the second conduction terminal, and a cut-off condition, wherein it prevents said passage of electric current, and
  a resonant circuit sized to reduce the electric voltage and/or the electric current applied to said first active switch at least in the moments when said first active switch switches from the cut-off condition to the saturation condition (and preferably also in the moments when said first active switch switches from the saturation condition to the cut-off condition),
wherein said resonant circuit comprises at least:
  a first resonance inductor placed on the first electric branch and having a first terminal connected to the first input terminal and a second terminal connected to the first intermediate electrical node,
  a second resonance inductor placed on the third electric branch and having a first terminal connected to the second intermediate electrical node and a second terminal connected to the first output terminal, and
  a first resonance capacitance, wherein the first resonance inductor and the second resonance inductor are inductively coupled together with a reciprocal coupling factor (K) less than 1.

From a practical point of view, the inductive coupling between the first resonance inductor and the second resonance inductor can be achieved by bringing the turns of the first resonance inductor close to the turns of the second resonance inductor, or in the case of inductors wound on a core of magnetic material, winding the turns of the first resonance inductor and the turns of the second resonance inductor on the same core of magnetic material or on magnetic circuits that share part of the core.

Compared to the exclusively capacitive implementations outlined in the introduction, in which there were two physically distinct resonance inductors, in the present solution the two resonance inductors are typically a single object, for example a single core of magnetic material (e.g. in the shape of a toroid, planar or another geometry) on which the turns of the first and second resonance inductors are suitably wound, practically halving the overall size of these two components which generally represent the most voluminous parts of the circuit.

Compared to traditional circuits coupled only magnetically (such as for example the flyback converter), the converter proposed here instead has the fundamental advantage of intrinsically Zero Voltage Switching like the other capacitive circuits already developed in the past, with all the important advantages that follow, and without the need for further quasi-resonance or active clamping circuits, therefore with a much lower circuit cost.

According to one aspect of the invention, the coupling factor (K) between the first resonance inductor and the second resonance inductor can be comprised between 0.1 and 0.8, preferably between 0.2 and 0.6.

This low coupling factor is a further advantage with respect to the classic transformer-based converters, which need ks close to 1 and are therefore more difficult to industrialise at low cost, and which, in order to simultaneously guarantee a high coupling factor and isolation between primary and secondary circuits require multiple constructive expedients which on the contrary are not necessary in the magnetic circuit with a low coupling factor which is the object of the present invention.

Thanks to the low coupling factor between the first resonance inductor and the second resonance inductor, the mutual inductance that determines their coupling is reduced and it does not come into play in the overall resonance of the circuit, thus allowing the converter to function correctly. In fact, even from a theoretical point of view, the self-inductance of the first resonance inductor and the self-inductance of the second resonance inductor are the inductance components that determine the resonance of the circuit together with the resonance capacitance, while the mutual inductance component, useful for transferring energy from the primary circuit to the secondary circuit by induction, does not intervene in the resonance of the circuit.

According to a possible embodiment of the present invention, the first resonance capacitance can comprise a first terminal connected to the first intermediate electrical node and a second terminal connected to the second intermediate electrical node.

Thanks to this solution, a hybrid converter is obtained which allows the transfer of electric power both by capacitance, through the first resonance capacity, and by induction, through the mutual inductive coupling between the first resonance inductor and the second resonance inductor.

This solution of hybrid capacitive/inductive coupling allows achieving numerous advantages, especially in terms of the reduction of sizes, the reduction of peak voltages and an increase in efficiency.

As regards the overall dimensions, this hybrid coupling solution allows obtaining a further reduction in the overall dimensions of the resonance inductors thanks to the fact that the magnetic flux is reduced with respect to the analogous circuit coupled only by capacitance.

In fact, in the converter coupled only by capacitance, during the turning on of the active switch, the resonance inductor placed on the primary circuit is charged, accumulating energy in the form of magnetic flux, which is transferred to the load only by capacitance during the subsequent turn-off period of the active switch.

On the contrary, by virtue of the inductive coupling between the first resonance inductor, located in the primary circuit, and the second resonance inductor, located on the secondary circuit, in the hybrid converter proposed here, a part of the energy is transferred to the load already during the charging period of the first inductor, consequently reducing the maximum magnetic flux in the resonance inductors with the same power transferred to the load.

This entails the possibility of undersizing the core of magnetic material or in any case of choosing a core with lower magnetic permeability, which typically corresponds to lower losses at higher frequencies, without penalising dimensions and efficiency as would happen with a capacitive coupling only.

As far as the peak voltage is concerned, since the energy is transferred inductively also during the turning-on period of the active switch, it follows that with the same power transferred to the load, the first resonance inductor accumulates less magnetic energy and is therefore subjected to lower peak currents.

For the same reason, during the subsequent turning-off phase of the first switch, the first resonance inductor has less energy to be transferred to the resonance capacitance, so that both said resonance capacitance and the active switch must withstand a much lower peak voltage than in the traditional solutions.

This entails the possibility of using components capable of withstanding lower voltages and therefore typically cheaper, faster and more compact.

Finally, as far as efficiency is concerned, the fact of transferring energy to the load inductively (magnetic) during the turn-on phase of the active switch and by capacitance (electric) during the turn-off phase allows the reactive currents to be reduced to equal power transferred to the load and, therefore, to increase the efficiency of the circuit with respect to the already highly efficient circuit coupled exclusively via capacitance.

Compared to exclusively capacitively-coupled circuits, the reduction of peak voltages also allows the use of active switches (e.g. MOSFETs) closer to the ideal and therefore characterised by lower losses (e.g. a lower channel resistance allows reducing the static losses, while lower rise and fall times allow reducing the dynamic losses).

According to one aspect of this embodiment, the resonant circuit can comprise a second resonance capacitance having a first terminal connected to the second output terminal and a second terminal connected to the second input terminal (or to a reference voltage to which the second input terminal is also connected).

Thanks to this solution, the resonance capacitances also act as isolation capacitances which advantageously divide the converter into a primary circuit and a galvanically-separated secondary circuit, although electrically coupled by hybrid capacitive and inductive coupling, with the advantages outlined above.

However, it is not excluded that in other embodiments the first resonance capacitance can comprise a first terminal connected to the first intermediate electrical node and a second terminal connected to the second input terminal (or to a predetermined reference voltage to which the second input terminal is also connected), so as to be in parallel with the second electric branch on which the first active switch is placed.

Alternatively, the first resonance capacitance could comprise a first terminal connected to the second intermediate electrical node and a second terminal connected to the second output terminal (or to a predetermined reference voltage to which the second output terminal is also connected), so as to be in parallel with the fourth electric branch.

Thanks to these solutions, a purely inductive coupling system is obtained which, however, also allows realising a resonator capable of efficiently transferring electric energy to the load with relatively small dimensions.

A different aspect of the invention provides that the converter can further comprise a first controller configured to turn on and off the first active switch in a periodic manner, wherein said first controller is particularly configured to measure the electric voltage applied to the first conduction terminal of the first active switch and to turn on said first active switch when the measured voltage is cancelled, i.e. reaches a value equal to zero.

This solution is particularly useful for guaranteeing high efficiency in a wide range of variation of the system's working conditions (for example variations in load or input voltage). Here it should be pointed out that in the present description, a controller can be any electric/electronic device capable of determining and generating a suitable control/driving signal for the corresponding active switch. Each controller can also be associated with a driver, which is adapted to amplify the control/driving signal generated by the controller and apply it to the corresponding active switch.

A different aspect of the invention provides that the fourth electric branch can comprise a diode, the cathode of which is connected with the second intermediate electrical node and whose anode is connected with the second output terminal.

In this way, it is advantageously possible to realise a rectifying stage, which is able to convert the voltage wave produced by the first active switch into a direct voltage, or a voltage similar to a direct voltage, useful for supplying the electrical load.

In other embodiments, instead of the diode, the fourth electric branch can comprise a second active switch, for example a MOSFET or other transistor, which has a first conduction terminal connected to the second terminal of the first resonance capacitance, a second conduction terminal connected with the second output terminal, and a control terminal adapted to receive an electric driving signal to switch the second active switch between a saturation condition, wherein it allows the passage of electric current between the first and the second conduction terminals, and a cut-off condition, wherein it prevents said passage of electric current.

Thanks to this second solution, the rectifying stage can be more efficient overall, realising for example an efficient and low-cost synchronous rectification, since it is based on a single active switch referred to a constant potential, for example the ground terminal of the secondary circuit.

In the context of this second solution, a preferred aspect of the invention provides that the converter can comprise a second controller configured to turn on and turn off the second active switch in a periodic manner, wherein said second controller is particularly configured to measure the electric voltage applied to the first conduction terminal of the second active switch and to turn on said second active switch when the measured voltage is cancelled, i.e. reaches a value equal to zero.

In this way, it is advantageously possible to ensure that the turning on of the second active switch also takes place in ZVS mode, reducing losses and thus increasing the efficiency of the circuit.

Moreover, the fact of having a controlled switching on the basis of the voltage measurement allows guaranteeing high efficiency in a wide range of variation of the working conditions of the system.

According to a preferred aspect of this solution, the second controller can be further configured to maintain the second active switch on for a turn-on time that is shorter than the duration of the period, turning it off at the moment when the first controller turns off the first active switch or with a certain delay, that is, in a subsequent moment.

Thanks to this solution, by appropriately adjusting the turn-off delay of the second active switch with respect to the turning off of the first active switch, it is effectively possible to continuously regulate the electric power transmitted to the electrical load, from a maximum value, obtainable if the second active switch is turned off at the same moment in which the first active switch is turned off, at a value equal to zero, which can be obtained if the second active switch remains on for an entire period, or if the second switch is never turned off.

For example, the second controller can be configured to measure a value of the electric voltage applied to the electrical load, for example to the first output terminal, and to vary the delay in turning off the second active switch so as to minimise, for example cancel, a difference between the measured value and a desired value of said electric voltage.

In this way, a control loop in retraction is obtained which, starting from a desired value of the voltage to apply to the electrical load, representative of the electric power required by the load itself, is able to automatically adjust the turn-off delay of the second active switch, in order to apply to the electrical load a real value of the electric voltage substantially equal to the desired one.

An electrical effect associated with this adjustment consists in the fact that, by increasing the turn-off delay of the second active switch, a progressive increase in the peak value of the electric voltage that is applied to the first active switch can be manifested, for example at the first conduction terminal of the first active switch. This peak voltage increase on the primary circuit derives from the fact that increasing the turn-off delay of the secondary switch reduces the active energy transferred to the load, increasing the reactive energy accumulated in the circuit.

Taking advantage of this effect, a further aspect of the invention provides that the first controller can be configured to measure the peak value of the electric voltage applied to the first active switch, for example to the first conduction terminal of the first active switch, and to vary the turn-on time of the first active switch so as to minimise, for example cancel, a difference between the measured value and a desired value of said electric voltage peak.

Thanks to this solution, it is advantageously possible to regulate the operation of the first active switch according to the needs of the electrical load to be supplied, preventing the peak voltage from reaching excessively high values and, thanks to the reduction of the turn-on time of the first active switch, making it so that the second active switch always works with the minimum possible turn-off delay and, therefore, in the best conditions of efficiency, given essentially by the minimum reactive energy accumulated in the system.

According to another aspect of the invention, the resonant circuit can comprise a third resonance inductor, preferably having a small inductance value, arranged along an electric branch which connects the intermediate electrical node to the first terminal of the first resonance capacitance.

This third resonance inductor enters the calculation of the overall resonance frequency of the circuit, leaving the total inductance of the circuit unchanged. In other words, for a given resonance frequency of the circuit, if the inductance value of the third resonance inductor is increased, the inductance values of the first and/or of the second resonance inductors are correspondingly decreased, maintaining the dimensions roughly constant. The advantage given by the introduction of the third resonance inductor lies in the introduction of a further resonance harmonic of the circuit with a higher frequency than the fundamental one, which involves voltage oscillations on the first terminal of the switches (e.g. drain) during the turn-off time and current fluctuations in the switches' channel during the turn-on time.

The voltage oscillations on the first terminal are marginally useful for at least slightly increasing the power transferred to the load, since, being at a higher frequency than the fundamental frequency, they pass the capacitive barrier which acts as a high-pass filter more easily.

The current fluctuations during the turn-on time of the switches can instead be extremely useful, since, if the period of current oscillation is suitably calculated to be a submultiple of the turn-on period of the switches, it is possible to minimise the instantaneous turn-off current, therefore bringing the circuit in conditions close to Zero Current Switching in the turn-off phase.

This effect is particularly useful for minimising the dynamic turn-off losses of the first switch placed on the primary circuit.

In fact, although the switch placed on the primary circuit is already Zero Voltage Switching in the turn-on phase (and Zero Current Switching), the turning off could take place in conditions of maximum current and therefore of non-zero dynamic loss proportional to the current peak and turn-off time.

On the contrary, thanks to the addition of the upper harmonic, which produces current oscillation, and a suitable choice of its frequency, it is advantageously possible to turn off the switch in Zero Current Switching conditions or in any case with strongly reduced currents, drastically reducing the dynamic turn-off losses.

In another aspect of the invention, the converter can further comprise a tank capacitance connected in parallel to the diode or to the second active switch.

Additionally or alternatively, the converter could comprise a tank capacitance connected in parallel to the first active switch.

The tank capacitances in parallel to the primary circuit switch and secondary circuit diode (or switch in the case of synchronous rectification) can help to reach the tuning of the circuit and to minimise the voltage derivative at the moment of turning on the primary circuit switch, thus guaranteeing lower dynamic turn-on losses due to sudden changes in current.

Moreover, these capacitances have a positive effect as they are able to make the circuit more insensitive with respect to the construction tolerances of the switches and components and in particular with respect to the eddy capacitances of switches and inductances. Furthermore, the tank capacitances lower the resonance frequency of the circuit, which in some situations can be advantageous.

Finally, the tank capacitances can be connected through additional switches in series only under certain voltage or power conditions (e.g. in conditions of high input voltage and low power transferred to the load) to simply reduce the power transferred to the load.

BRIEF DESCRIPTION OF THE FIGURES

Further features and advantages of the invention will be more apparent after reading the following description provided by way of non-limiting example, with the aid of the accompanying drawings.

DETAILED DESCRIPTION

Figure 1:
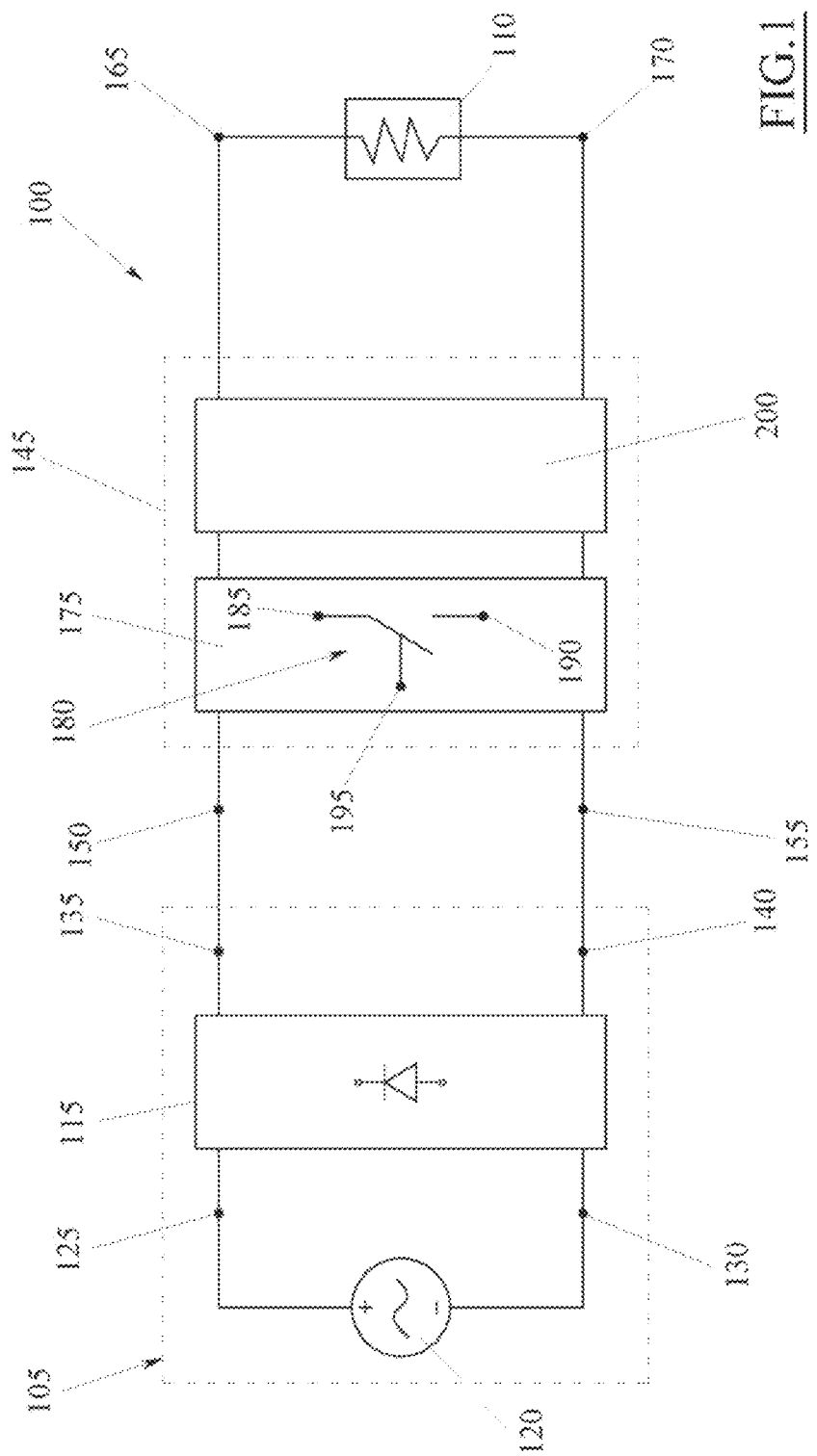
FIG. 1 is the general diagram of an electric power transfer system according to an embodiment of the present invention.

One embodiment of the present invention provides a system 100 for the transfer of electric power from a direct electric voltage source 105, or at least similar to a direct voltage, to an electrical load 110.

The electrical load 110, which is generically represented with the symbol of an electric resistance, can be any electric or electronic device that must be electrically powered to allow its operation and/or to charge the internal batteries of the device itself.

Classic examples of electric/electronic devices of this type are computers, tablets, smartphones, televisions, household appliances, home automation systems, servers and many others.

In some embodiments, the direct voltage source 105 can be a direct voltage generator or a battery.

In other embodiments, the direct voltage source 105 can instead comprise a rectifier 115 adapted to receive in input an alternating voltage coming from an alternating voltage source 120, to convert said alternating voltage into a rectified voltage more or less similar to a direct voltage and to supply said direct voltage in output.

The alternating voltage source 120 can be, for example, a common electricity distribution grid, which can be adapted to provide an alternating voltage of varying value depending on the countries or uses (e.g. industrial or domestic). Merely by way of example, the alternating voltage source 120 can be a 50-60 Hz, 90-240V AC grid.

In general terms, the rectifier 115 can comprise a first input terminal 125 and a second input terminal 130, which can be connected to the alternating voltage source 120, so that the latter is adapted to apply among these two terminals an electric voltage difference which is variable in an alternative way over time (alternating voltage).

For example, the second input terminal 130 of the rectifier 115 can be connected to a reference voltage, and is generally referred to as a neutral terminal, and the alternating voltage source 120 can be adapted to apply to the first input terminal 125, generally called a phase terminal, a voltage that varies in sinusoidal manner over time around the average value defined by the reference voltage. It should be noted that the generator 120 can be connected to the terminals 125 and 130, exchanging the terminals without this affecting the output of the rectifier 115.

The rectifier 115 can further comprise a first output terminal 135 and a second output terminal 140, between which the direct electric voltage difference obtained by converting the alternating voltage received at the input is applied, where the value of the electric voltage applied to the first output terminal 135 is generally not lower than the value of electric voltage applied to the second output terminal 140.

For example, the second output terminal 140 can be connected to the reference voltage while a constant voltage (except for the ripple), of a value not lower than the value of the reference voltage, can be applied to the first output terminal 135, which is obtained by rectifying the alternating input voltage.

The rectifier 115 can be made in the form of a diode bridge (for example a Graez bridge) but it is not excluded that in other embodiments it can be a single diode rectifier, a combined double diode, a synchronous rectifier or other still.

Optionally, the rectifier 115 can be provided with a filtering circuit, for example a capacitive filter, whose function is to stabilise the voltage difference between the first and second output terminals 135 and 140, reducing the ripple and thus levelling the voltage at a substantially constant value over time.

The system 100 further comprises a converter, globally indicated with 145, i.e. an electric circuit adapted to receive in input the voltage supplied by the source 105, to convert it and transmit it to the electrical load 110.

In general terms, the converter 145 can comprise a first input terminal 150 and a second input terminal 155, between which a substantially constant voltage difference is applied, obtained starting from the voltage supplied by the direct voltage source 105, where the value of the electric voltage applied to the first input terminal 150 is generally higher than the value of electric voltage applied to the second input terminal 155.

For example, the second input terminal 155 can be connected to the second output terminal 140 of the rectifier 115 or to the reference voltage, while the first input terminal 150 can be connected to the first output terminal 135 of the rectifier 115.

Optionally, between the rectifier 115 and the converter 145, an auxiliary circuit (not shown) can be interposed, adapted to receive in input the voltage supplied by the rectifier 115 and to convert it into another voltage, for example into a voltage of reduced value, which is more suitable for supplying the converter 145 and/or useful for other purposes, for example to improve the power factor and/or to facilitate the control of the system 100. The converter 145 can further comprise a first output terminal 165 and a second output terminal 170, which can be electrically connected to opposite ends of the electrical load 110.

Going into more detail, the converter 145 can comprise at least one wave generator 175, that is, an electrical circuit which is supplied by the direct voltage source 105, for example by the rectifier 115, to generate a voltage wave, that is, a succession of voltage pulses that follow one another with a predetermined time frequency.

Preferably, the wave generator 175 is adapted to generate a high-frequency voltage wave, typically around hundreds of KHz, MHz, tens of MHz or hundreds of MHz.

To generate the voltage wave, the wave generator 175 comprises at least one active switch 180, for example a transistor (e.g. bipolar junction transistor BJT, field effect transistor FET, MOSFET, GaN, SiC, MESFET, JFET, IGBT and others), which is able to turn on and off (i.e. pass from a cut-off condition to a saturation condition and vice versa) upon the command of a suitable electric driving signal.

More particularly, the active switch 180 can comprise a first conduction terminal 185 (e.g. the drain of an N-type MOSFET), a second conduction terminal 190 (e.g. the source of an N-type MOSFET), and a control terminal 195 (e.g. the gate of an N-type MOSFET). When the active switch 180 is off, or is in a cut-off condition, the electric current cannot flow between the first and second conduction terminals 185 and 190.

Conversely, when the active switch 180 is on, i.e. when it is in the saturation condition, the electric current flows freely between the first and second conduction terminals 185 and 190.

The switching of the active switch 180 between these two conditions is controlled by the electric driving signal, which is applied to the control terminal 195.

In practice, when the voltage of the electric driving signal is greater than or equal to a certain threshold value, the active switch 180 is in a state of saturation (turned on and capable of conducting electric current).

On the other hand, when the voltage of the electric driving signal is lower than the threshold value, the active switch 180 is in the cut-off condition (off).

To generate the voltage wave, the electric driving signal can be a periodic signal which varies between a minimum voltage value (possibly zero) lower than the threshold value of the active switch 180 and a maximum value greater than said threshold value.

For example, the electric driving signal can be a square wave signal.

The frequency of the electric driving signal, which in practice corresponds to the switching frequency of the active switch 180 and, therefore, to the generated voltage wave frequency, is preferably chosen with a rather high value, for example around hundreds of KHz, MHz, tens of MHz or hundreds of MHz.

During each period of the driving signal, the period of time during which the electric driving signal is greater than the turn-on threshold of the active switch 180 can be called the turn-on time, while the time frame during which the electric driving signal is lower than the turn-on threshold of the active switch 180 can be called the turn-off time.

When the electric driving signal, passing from the minimum voltage value to the maximum voltage value, exceeds the threshold value, it is said that the active switch 180 turns on or is turned on.

When, on the other hand, the electric driving signal, passing from the maximum voltage value to the minimum voltage value, falls below the threshold value, it is said that the active switch 180 turns off or is turned off.

Figure 2:
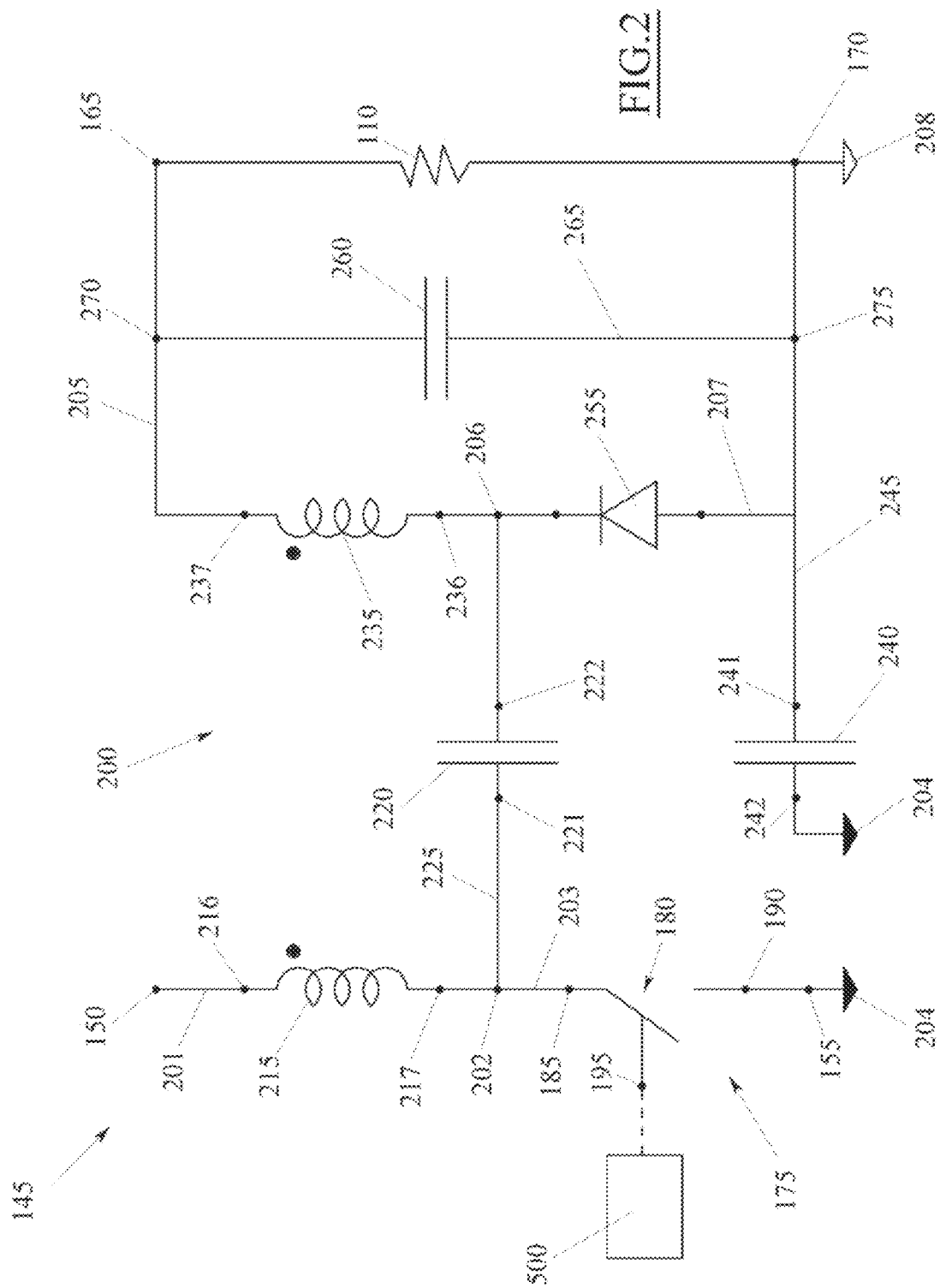
FIG. 2 is the electrical diagram of a converter that can be used in the system of FIG. 1.

The electric driving signal of the active switch 180 can be generated by a special controller, indicated with 500 in FIG. 2, which can be suitably connected to the control terminal 195 of the active switch 180 through any system capable of transferring electric signals (also wireless).

The controller 500 can be any electric/electronic device capable of generating the electric driving signal and possibly changing one or more characteristics thereof, for example the turn-on and turn-off time, keeping the period constant or varying it.

A respective driver (not shown) can be associated with the controller 500, i.e. an electric/electronic device adapted to receive the driving signal generated by the controller 500, to suitably amplify it and finally to apply it to the active switch 180.

According to a preferred aspect of the present solution, the controller 500 can be for example configured to measure the electric voltage which is applied to the first conduction terminal 185 of the first active switch 180 (e.g. to the MOSFET drain) and to turn on the active switch 180 when the measured voltage is cancelled, i.e. drops to a value equal to zero.

After this turn-on step, the controller 500 can maintain the first active switch turned on for a certain turn-on time, which can vary in order to vary the energy of the system.

For example, the turn-on time can be adjusted according to the peak electric voltage on the first conduction terminal 185, to ensure minimum reactive energy of the system.

At the end of the turn-on time, the controller 500 can be configured to turn off the first active switch 180 and to leave it off until the voltage is cancelled again.

In this way, the turn-off time remains substantially constant or can slightly vary only if there is a small variation in the waveform of the electric voltage at the first conduction terminal 185, for example due to different levels of power.

In addition to the active switch 180, the wave generator 175 also comprises a resonant circuit 200, for example a completely resonant or almost resonant reactive circuit.

The resonant circuit 200 is generally an electric circuit which comprises one or more reactances, for example one or more capacitances and/or inductances, which are suitably connected together and tuned so as to resonate at a given frequency.

The tuning of the resonant circuit 200 essentially consists in the sizing of the aforementioned reactances, respectively in terms of electric capacitance and inductance.

In this case, the resonant circuit 200 is connected to the active switch 180 and is tuned so as to reduce the electric voltage and/or the electric power that is applied to the active switch 180, during each switching phase from off to on and preferably also during each switching phase from on to off.

Preferably, the resonant circuit 200 is tuned so that during each switching stage of the active switch 180, the electric voltage and/or the electric current applied to the active switch 180 is reduced to a value equal to zero or substantially equal to zero, thus obtaining a wave generator 175 operating in zero voltage switching (ZVS) and/or zero current switching (ZCS) mode.

For example, the resonant circuit 200 can be tuned so as to resonate at a frequency equal to or near the driving frequency of the active switch 180.

In this way, the electric losses are considerably reduced during the switching cycles of the active switch 180, making it possible to increase the frequency of these cycles and therefore the frequency of the voltage wave generated by them, with the result of being able to increase the electric power transmitted, with the same applied voltage, or to be able to lower the applied voltage, with the same electric power transmitted.

Starting from these general considerations, one possible embodiment of the converter 145 is illustrated in FIG. 2.

In this embodiment, the converter 145 comprises a primary circuit and a secondary circuit. The primary circuit comprises a first electric branch 201, which extends from the first input terminal 150 to a first intermediate electrical node 202, and a second electric branch 203, which extends from said intermediate electrical node 202 to the second input terminal 155, or to a predetermined primary circuit reference voltage 204 which can also be connected to the second input terminal 155.

The secondary circuit comprises a third electric branch 205, which extends from the first output terminal 165 to a second intermediate electrical node 206, and a fourth electric branch 207, which extends from said intermediate electrical node 206 to the second output terminal 170, or at a predetermined secondary circuit reference voltage 208 to which the second output terminal 170 can also be connected.

The active switch 180 is placed on the second electric branch 203, for example so that the first conduction terminal 185 of the active switch 180 (for example the drain of an N-type MOSFET) is connected to the intermediate electrical node 202 and so that the second conduction terminal 190 of the active switch 180 (for example the source of an N-type MOSFET) is connected to the second input terminal 155 or simply to the reference voltage 204.

The resonant circuit 200 comprises a first resonance inductor 215, which is placed on the first electric branch 201 and comprises a first terminal 216 electrically connected to the first input terminal 150 and a second and opposite terminal 217 electrically connected to the intermediate electrical node 202.

The resonant circuit 200 further comprises a first resonance capacitance 220, which has a first electric terminal 221 and a second electric terminal 222, each of which is connected to a respective armature of the first resonance capacitance 220.

By means of an electric branch 225, the first terminal 221 can be connected to the first intermediate electrical node 202.

By means of an electric branch 230, the second terminal 222 can be connected to the second intermediate electrical node 206.

A second resonance inductor 235 can be placed on the third electric branch 205, the inductor comprising a first terminal 236 electrically connected to the second intermediate electrical node 206, and a second and opposite terminal 237 electrically connected to the first output terminal 165 of the converter 145.

The resonant circuit 200 can further comprise a second resonance capacitance 240, which has a first electric terminal 241 and a second electric terminal 242, each of which is connected to a respective armature of the second resonance capacitance 240.

By means of an electric branch 245, the first electric terminal 241 of the second resonance capacitance 240 can be electrically connected to the second output terminal 170 of the converter 145.

The second electric terminal 242 can be connected, by means of a further electric branch, to the second input terminal 155, or it can be connected to the primary circuit reference voltage 204.

In this way, the two resonance capacitances 220 and 240 also act as isolation capacitances which galvanically separate the primary circuit, which comprises at least the active switch 180 and the first resonance inductor 215, and the secondary circuit, which comprises at least the second resonance inductor 235 and electrical load 110.

Figure 3:
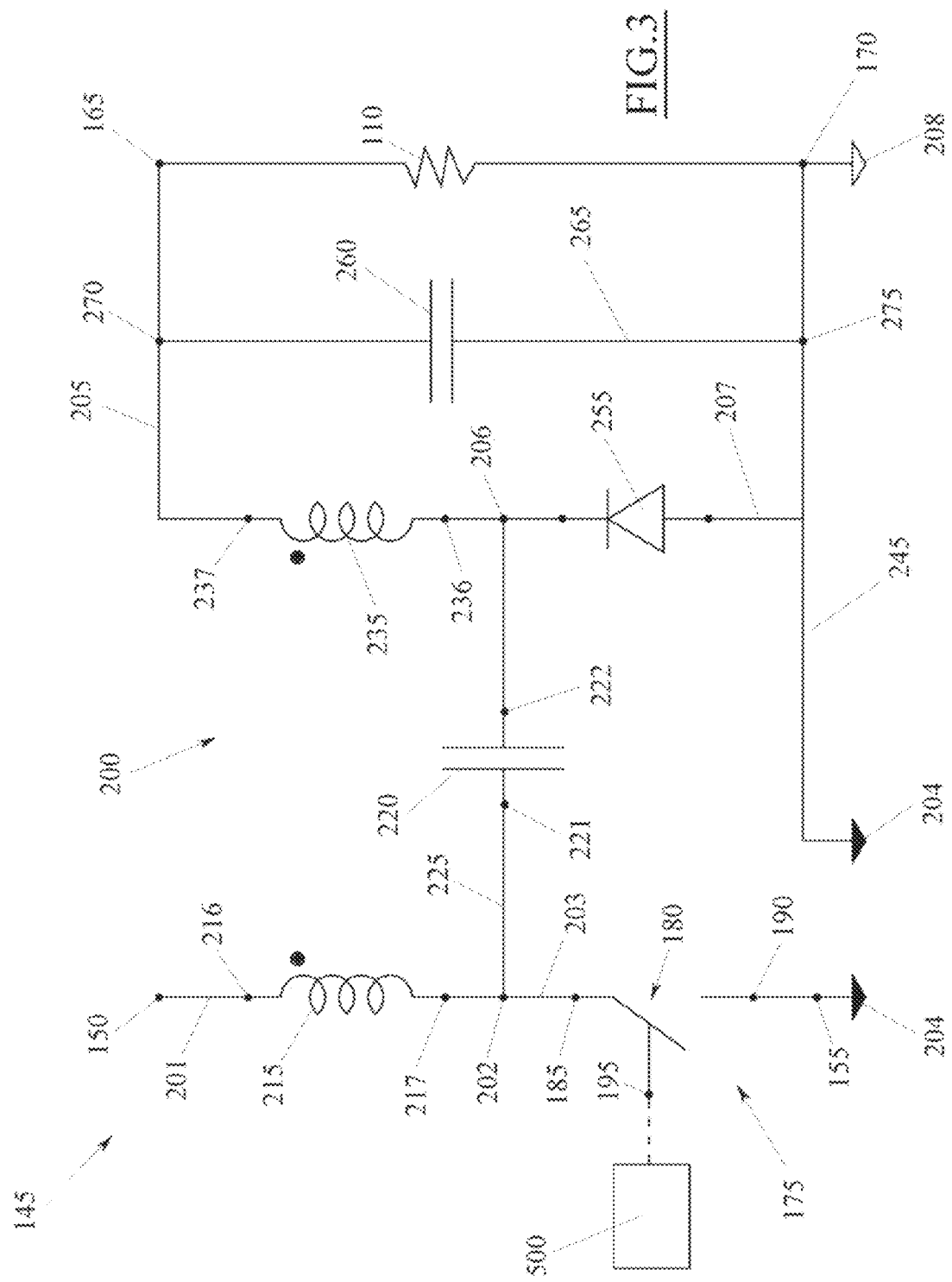
FIG. 3 is a variant of the converter of FIG. 2.

As shown in FIG. 3, however, there is also the possibility of realising a converter 145 which is not galvanically isolated, which is completely similar to that described above, with the difference that it is not provided with the second resonance capacitance 240 and that it has the electric branch 245 which directly connects the second output terminal 170 with the second input terminal 155, or with the primary circuit reference voltage 204.

The electric power can pass from the primary circuit to the secondary circuit thanks to the capacitive coupling realised by the first resonance capacitance 220 and possibly by the second resonance capacitance 240 (if present).

In particular, during each turn-on time of the active switch 180, the first resonance inductor 215 placed on the primary circuit is charged, accumulating energy in the form of magnetic flux, which is transferred to the electrical load 110 by capacitance, or through the capacitive electrical coupling realised by the first resonance capacitance 220, and possibly by the second resonance capacitance 240 (if present), during the subsequent turn-off time of the active switch 180.

As anticipated above, the first resonance inductor 215, the second resonance inductor 235, the first resonance capacitance 220 and the possible second resonance capacitance 240 (if present), are sized (tuned) so as to realise a resonator (resonant circuit 200) which reduces, and preferably cancels, the electric voltage and/or the electric current which is applied to the active switch 180 during each single switching phase from the cut-off condition (turn-off) to the saturation condition (turn-on) and, preferably, also from the saturation condition (turn-on) to the cut-off condition (turn-off).

In this way, at the intermediate electrical node 202, it is advantageously possible to obtain an electric voltage which, according to the electric driving signal of the active switch 180, is variable over time according to a waveform capable of guaranteeing ZVS and/or ZCS transitions of the active switch 180 itself.

Figure 4:
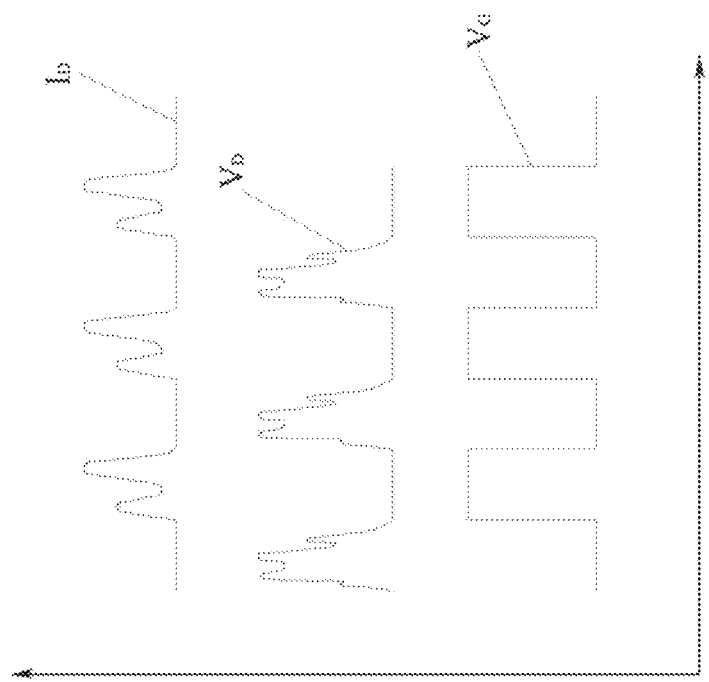
FIG. 4 is a graph showing a possible shape of the voltage and current wave that can be obtained at the intermediate electrical node of the converter according to FIG. 2 as a function of the driving signal.

The possible trends over time of the electric voltage $V_D$ at the intermediate electrical node 202 and the electric current $I_D$ which passes through the active switch 180 are shown in FIG. 4 according to the electric driving signal $V_G$ of the active switch 180.

In practice, these waveforms are regardless the same or similar to those that can be obtained by means of a wave generator based on a circuit structure similar to a class E or F amplifier or based on any other ZVS and/or ZCS resonant amplifier.

By obtaining the same waveform, or by generating the same voltage wave, the wave generator 175 outlined above obtains the same advantages as the aforementioned resonant wave generators, in particular in terms of reduction of electric losses during the switching phases of the active switch and therefore of increasing the operating frequencies.

Compared to these wave generators, the wave generator 175 has however the considerable advantage of not requiring bulky choke reactors, allowing a significant reduction in dimensions and costs.

According to an important aspect of the present invention, the first resonance inductor 215 and the second resonance inductor 235 are inductively coupled to each other with a reciprocal coupling factor K lower than the unit, i.e. less than 1.

From a practical point of view, this inductive coupling can be achieved by bringing the turns of the first resonance inductor 215 closer to the turns of the second resonance inductor 235, or in the case of inductors wound on a core of magnetic material, winding the turns of the second resonance inductor 235 directly on the core of magnetic material on which the coils of the first resonance inductor 215 are also wound or on magnetic circuits that share part of the core.

Thanks to this solution, the two resonance inductors 215 and 235 can be made in the form of a single component, for example a single core of magnetic material (e.g. in the shape of a toroid, planar or another geometry) on which the turns of the first and second resonance inductors 215 and 235 are suitably wound, practically halving the overall size of these two components which generally represent the most voluminous parts of the global circuit.

Moreover, by virtue of the inductive coupling between the first resonance inductor 215 and the second resonance inductor 235, the electric energy is transferred to the electrical load 110 not only during the turn-off phases (times) of the active switch 180 but also during the turn-on phases (times).

In practice, while the active switch 180 is on (saturation condition), the first resonance inductor 215, in addition to charging and accumulating energy in the form of magnetic flux, directly and simultaneously transfers at least a part of said energy to the secondary circuit, i.e. to the electrical load 110, thanks to the inductive coupling with the second resonance inductor 235.

In this way, the magnetic flux is overall lower with respect to a similar circuit coupled only by capacitance, allowing the core of magnetic material to be undersized or in any case to choose a core with lower magnetic permeability, which typically corresponds to lower losses than with higher frequencies, without penalising space and efficiency.

Moreover, since the energy is inductively transferred from the primary circuit to the secondary circuit also during the turn-on period of the active switch 180, with the same power transferred to the electrical load 110, the first resonance inductor 215 accumulates less magnetic energy and is therefore subjected to lower peak currents.

For the same reason, during the subsequent turn-off time of the active switch 180, the first resonance inductor 215 has less energy to transfer on the resonance/isolation capacitances 220 and 240, so that both the resonance/isolation capacitances 220 and 240 and the active switch 180 must withstand much lower peak voltages than the solutions coupled only by capacitance.

This entails the possibility of using components capable of withstanding lower voltages and therefore typically cheaper, faster and more compact.

Moreover, the reduction of the peak voltages allows adopting an active switch 180 (e.g. MOSFET) closer to the ideal and therefore characterised by lower losses (e.g. a lower channel resistance allows reducing the static losses, while lower rise and descent times allow reducing the dynamic losses).

The fact of transferring energy to the electrical load 110 inductively (magnetic) during the turn-on period of the active switch 180 and by capacitance (electric) during the turn-off period, lastly allows the reactive currents to be reduced to equal power transferred to the electrical load 110 and, therefore, to increase the overall efficiency of the converter 145 with respect to the already highly efficient converters coupled exclusively via capacitance. All these advantages are achieved while remaining within an intrinsically Zero Voltage Switching circuit, which allows the converter 145 described above to be characterised by much lower losses and overall dimensions compared to traditional circuits coupled only magnetically, such as the classic flyback converter.

In order for the converter 145 to function correctly, it is in any case preferable that the mutual inductance between the first resonance inductor 215 and the second resonance inductor 235, which is the inductance component useful for inductively transferring energy from the primary circuit to the secondary circuit, does not intervene in the resonance of the circuit.

Therefore, unlike what happens in classic transformer-based isolated converters (e.g. flyback), the coupling factor k between the first resonance inductor 215 and the second resonance inductor 235 must be less than 1, for example comprised between 0.1 and 0.8 and, even more preferably, comprised between 0.2 and 0.6.

With reference to the diagrams of FIGS. 2 and 3, the converter 145 can further comprise a diode 255, which is placed on the fourth electric branch 207 and is generally configured to allow the electric current to flow along said fourth electric branch 207 in only one direction.

The diode 255 can have its own cathode connected with the second intermediate electrical node 206, and its own cathode connected with the second output terminal 170.

The diode 255 turns on when the voltage between the anode and the cathode exceeds the threshold voltage of the diode, which enters into conduction and allows the current to flow between the anode terminal and the cathode terminal.

When the current is reduced to zero, the diode turns off.

In this way, the diode 255 realises a generic rectification stage, which is effectively able to transform the voltage wave coming from the primary circuit into a direct voltage, similar to a direct voltage, which is applied to the electrical load 110.

Possibly (although not necessarily), the rectifying stage of the converter 145 can also comprise a capacitor 260, which is placed on an electric branch 265 that extends from an intermediate node 270 of the third electric branch 205, comprised between the second resonance inductor 235 and the first output terminal 165, to an intermediate node 275 of the electric branch 245, so as to be in parallel with the electrical load 110.

Figure 5:
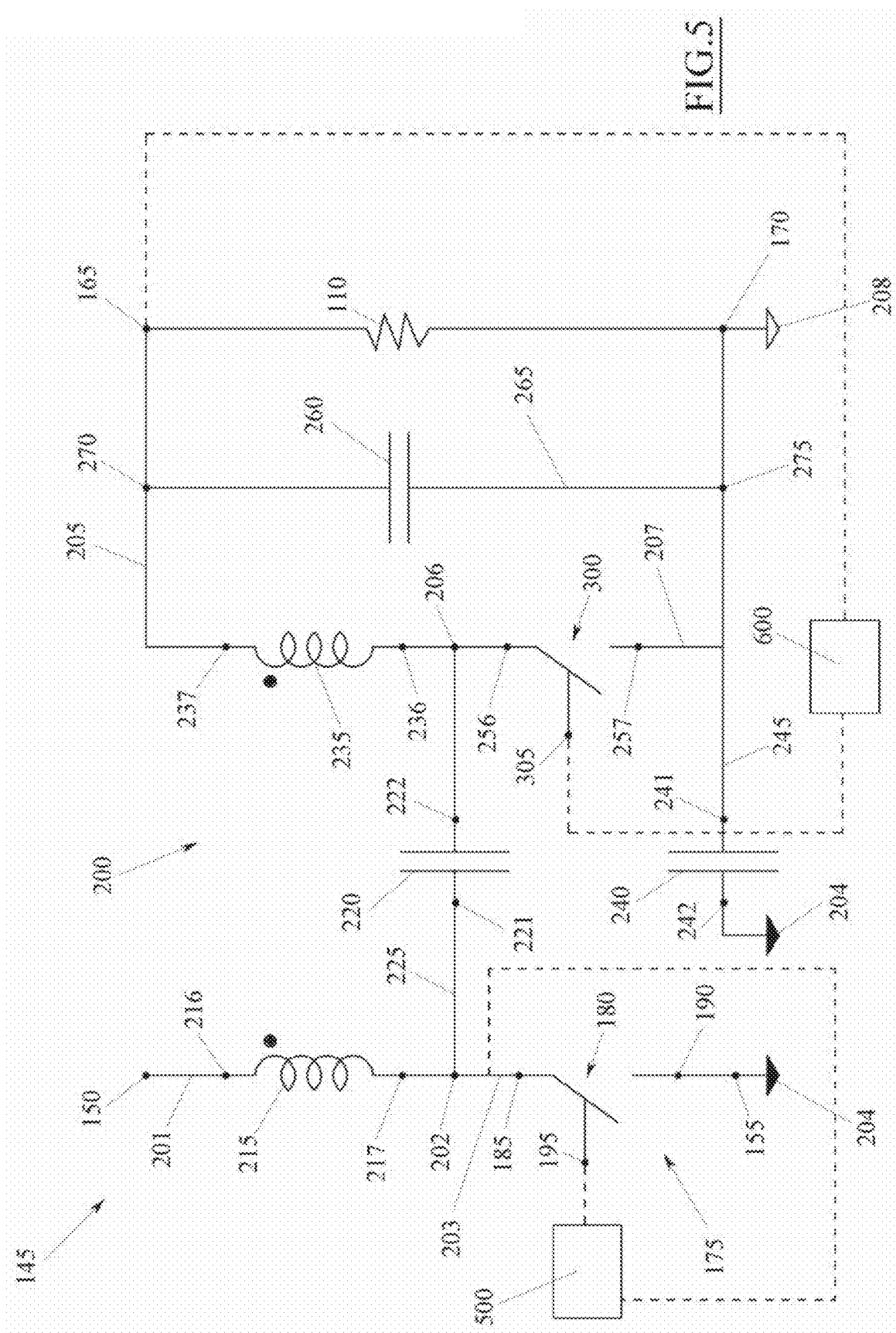
FIG. 5 is the electrical diagram of a converter that can be used in the system of FIG. 1, according to another variant of the present invention.

As shown in FIG. 5, in other more complex but more energy-efficient embodiments, at least for low current values, the diode 255 can be replaced by a second active switch 300 (e.g. MOSFET or other transistor) driven so as to realise, for example, a synchronous rectification.

In particular, the active switch 300 can comprise a first conduction terminal 256 (e.g. the drain of an N-type MOSFET) connected with the second intermediate electrical node 206, a second conduction terminal 257 (e.g. the source of an N-type MOSFET) connected with the second output terminal 170, and a control terminal 305 (e.g. the gate of an N-type MOSFET).

FIG. 5 shows, by way of example, the case in which the converter 145 is galvanically isolated as in FIG. 2, but the same solution could also be applied to the non-isolated case of FIG. 3.

When the active switch 300 is off, or is in a cut-off condition, the electric current cannot flow between the first and second conduction terminals 256 and 257.

Conversely, when the active switch 300 is on, i.e. when it is in the saturation condition, the electric current flows freely between the first and second conduction terminals 256 and 257.

The switching of the active switch 300 between these two conditions is controlled by the electric driving signal, which is applied to the control terminal 305.

In practice, when the voltage of the electric driving signal is greater than or equal to a certain threshold value, the active switch 300 is in a state of saturation (turned on and capable of conducting electric current).

On the other hand, when the voltage of the electric driving signal is lower than the threshold value, the active switch 300 is in the cut-off condition (off).

The electric driving signal can be a periodic signal which varies between a minimum voltage value (possibly zero) lower than the threshold value of the active switch 300 and a maximum value greater than said threshold value.

For example, the electric driving signal can be a square wave signal.

During each period of the driving signal, the period of time during which the electric driving signal is greater than the turn-on threshold of the active switch 300 can be called the turn-on time, while the time frame during which the electric driving signal is lower than the turn-on threshold of the active switch 300 can be called the turn-off time.

When the electric driving signal, passing from the minimum voltage value to the maximum voltage value, exceeds the thresholds value, it is said that the active switch 300 turns on or is turned on.

When, on the other hand, the electric driving signal, passing from the maximum voltage value to the minimum voltage value, falls below the thresholds value, it is said that the active switch 300 turns off or is turned off.

The electric driving signal of the active switch 300 can be generated by a special controller, indicated with 600 in FIG. 5, which can be suitably connected to the control terminal 305 of the active switch 300 through any system capable of transferring electric signals (also wireless).

The controller 600 can be any electric/electronic device capable of generating the electric driving signal and possibly changing one or more characteristics thereof, for example the turn-on and turn-off time, keeping the period constant or varying it.

A respective driver (not shown) can be associated with the controller 600, i.e. an electric/electronic device adapted to receive the driving signal generated by the controller 600, to suitably amplify it and finally to apply it to the active switch 300.

The active switch 300 can be driven by the controller 600 so as to simulate an ideal diode. In practice, the controller 600 can be configured to generate a calibrated driving signal so as to turn on the active switch 300 when the secondary circuit voltage, i.e. the electric voltage at the first terminal 256 (e.g. on the MOSFET drain), drops below 0V and turns it off substantially in synchrony with the turning off of the active switch 180 or, in any case, when the current is substantially zero, to maximise the power transferred to the load 110.

Figure 6:
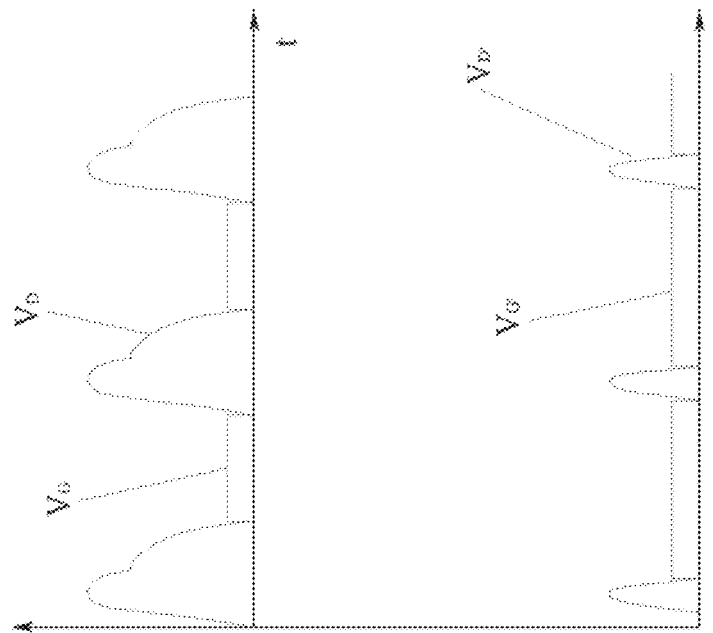
FIG. 6 is a graph showing the trend of the driving signal of the first active switch and the second active switch of FIG. 5 and the wave forms of the electric voltages applied to them, in the condition in which both active switches are turned off at the same time.

FIG. 6 compares the waveforms of the voltage $V_D$ on the first conduction terminal 185 of the active switch 180 (e.g. on the MOSFET drain) and of the relative driving signal $V_G$ applied to the control terminal 195, with the voltage waveforms $V_D$ on the first conduction terminal 256 of the active switch 300 (e.g. on the drain of the MOSFET) and of the relative driving signal $V_G$ applied to the control terminal 305.

It can be seen how in the circuit in question the waveform of the voltage $V_D$ can be different from that of the classic E, F or similar circuits, since there is a first part of the voltage waveform $V_D$, the one in which the voltage $V_D$ also on the secondary circuit is not null, in which the voltage $V_D$ on the primary circuit has a direct derivative, while at the moment when the voltage $V_D$ on the secondary circuit cancels, there is a discontinuity in the derivative of the voltage $V_D$.

In general, the use of the active rectification switch 300 instead of the diode allows operating at higher frequencies, for example MHz, tens of MHz or hundreds of MHz and typically allows reducing static losses.

If we consider the example of using an N-type or GaN-type MOSFET transistor, it is in fact possible to have a low channel resistance, which allows limiting the losses compared to the diodes.

Another important advantage of the use of the active switch 300 consists in the further degree of freedom of control given by the possibility of turning off the active switch 300 with a certain delay with respect to the moment which guarantees the maximum power transfer, i.e. with a certain delay with respect to the turning-off moment of the active switch 180 placed on the primary circuit.

Figure 7:
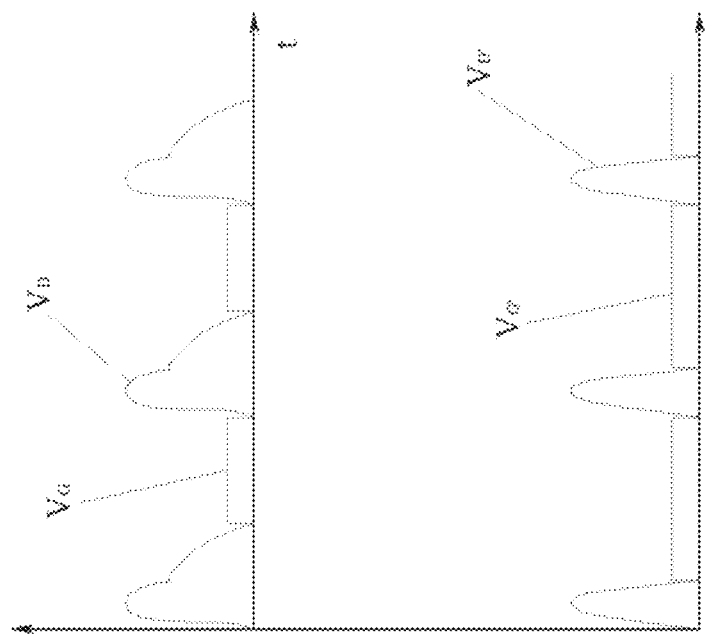
FIG. 7 is a graph showing the trend of the driving signal of the first active switch and the second active switch of FIG. 5 and the waveforms of the electric voltages applied to them, in the condition in which the second active switch is turned off with a certain delay with respect to the first active switch.

As shown in FIG. 7, by delaying the moment of turning off the active switch 300 with respect to the active switch 180, a peak in the voltage $V_D$ is obtained which is lower than the previous case, which translates into less power transferred to the load.

In the extreme case in which the active switch 300 is always on, i.e. with a turn-on time equal to the driving signal period (e.g. 100% duty cycle), energy would not be transferred to the load and there would only be reactive current in the circuit.

Consequently, between the maximum energy transfer condition to the load 110 (simultaneous turning off of both the active switches 180 and 300) and the condition where no power is transferred to the load (active switch 300 always on) there are infinite possible points for turning on the active switch 300, which can be selected to continuously regulate the electric power transferred to the load.

In practice, if the turn-off delay of the active switch 300 is zero, the two active switches 180 and 300 simultaneously turn off and the energy transferred to the electrical load 110 is maximum.

By increasing the turn-off delay of the active switch 300, the energy transferred to the electrical load is progressively reduced.

The minimum value of the transmitted energy is equal to zero and is reached when the delay is so high that the turn-on time of the active switch 300 is equal to the driving signal period (100% duty cycle), or if the active switch remains always on.

In this way, the turn-off moment of the active switch 300 becomes a degree of freedom which can be effectively exploited for controlling the voltage, current or power on the load 110.

For example, it is advantageously possible to feedback the turn-off delay of the active switch 300 with respect to the active switch 180 to adjust the output voltage in a simple, fast and reliable way and without direct feedback between the primary circuit and the secondary circuit, therefore with low costs.

In practice, the controller 600 can be configured to measure a value of the electric voltage applied to the electrical load, for example to the first output terminal 165, and to vary the delay in turning off the active switch 300 so as to minimise, for example cancel, a difference between the measured value and a desired value of said electric voltage.

The real value of the electric voltage applied to the first output terminal 165 can be measured by the controller 600 through a simple electrical connection, while the desired value to be applied to the load can be information which is supplied to the controller 600 directly by the electrical load 100 itself.

In this way it is possible to realise a feedback control loop on the secondary circuit configured so that when less power is needed at the electrical load 110, the second controller 600 delays turning off the active switch 300, reducing the electric voltage on the electrical load 110 and the power transferred to the same.

A second electric effect which can be deduced from FIG. 7 consists in the fact that, with the same turn-on time of the active switch 180 (and therefore of the average energy in the circuit), an increase in the peak voltage $V_D$ is obtained if there is a delay turning on the active switch 300.

This second effect can be clearly explained by the fact that by reducing the current on the electrical load 110, the average reactive energy in the circuit is increased, which translates into a higher peak voltage on the primary circuit.

This second electric effect can be effectively exploited to transfer to the primary circuit the information of lower power demand required for the electrical load 110, without having to use additional communication circuits between the primary and secondary circuits (e.g. optoisolators or digital or analogue capacitive isolators, adapted to transfer information between the primary circuit and the secondary circuit).

In fact, if the controller 600 increases the delay in turning off the active switch 600 to deal with a lower power demand by the electrical load 110, the primary circuit will see a corresponding increase in the peak voltage $V_D$.

This voltage peak $V_D$ can be used as a feedback signal to adjust the turn-on time of the active switch 180.

In practice, the first controller 500 can be configured to measure the peak value of the electric voltage applied to the active switch 180, for example to the first conduction terminal 185 of the first active switch 180 itself, and to vary the turn-on time of the first active switch 180 so as to minimise, for example cancel, a difference between the measured value and a desired value of said electric voltage peak.

The peak value of the voltage $V_D$ is easily measurable by the controller 500, for example with a peak detector (e.g. diode and capacitance), while the desired value of said voltage peak can be a design parameter.

In this way it is possible to realise an additional feedback control loop on the primary circuit that maintains the peak voltage $V_D$ constant by varying the turn-on time of the active switch 180.

Since the voltage $V_D$ would tend to increase in the event of greater reactive power with respect to the active power transferred to the electrical load 110, this further feedback loop tends to reduce the turn-on time of the active switch 180 if the load 110 absorbs less active power.

This control system eliminates the need for optoisolators or other information transmission systems between the primary and secondary circuit, which are typically bulky (due to the minimum isolation distances necessary for certification purposes), costly and unreliable, and ensures high dynamics (thanks to the feedback loop on the secondary circuit) and high efficiency of the controller (thanks to the feedback loop on the primary circuit).

In fact, the feedback loop on the primary circuit always maintains the minimum energy required to supply the electrical load 110, making the secondary controller 600 work with the minimum possible delay (and therefore the greatest possible ratio between active energy and reactive energy on the load).

A further advantage of this regulation system is that it allows light load conditions to be managed much more efficiently than the traditional techniques (for example based on pulse trains) and with fewer radiated and conducted emission problems (as traditional techniques typically introduce low-frequency harmonics which are more difficult to filter with compact filters).

It should be noted that this type of control system is substantially variable in frequency, since the turn-off time of the primary switch remains approximately constant (except for modest variations caused by the change in shape of the operating drain voltage according to the circuit energy), while the turn-on time of the primary switch changes considerably according to the energy required by the load.

As mentioned above, the resonant circuit 200 of the converter 145 described above can guarantee the useful resonance for having substantially ZVS and ZCS transitions in the turn-on phase, i.e. during the switching of the active switch 180 from the cut-off condition (off) to the saturation condition (on), and substantially ZVS transitions also during the turn-off phase, i.e. during the switching of the active switch 180 from the saturation condition (on) to the cut-off condition (off) again.

In particular, the ZVS and ZCS condition can be guaranteed by the simple tuning of the circuit, or more suitably it can be carried out thanks to the measurement of the voltage and/or current at the first conduction terminal (e.g. at the MOSFET drain) useful for dynamically varying the turn-on and/or turn-off moment of the switches 180 and 300.

An active control system for the turn-on moment of the switches 180 and 300, based in particular on the detection of the moment in which the drain voltage is cancelled, is particularly useful for ensuring high efficiency in a wide range of variation of the working conditions of the system (for example variations in load or input voltage).

In short, the turn-off time is weakly variable according to the working conditions of the system, and the turn-on moment is preferably actively controlled by a suitable circuit which detects the instant in which the drain voltage of the switches 180 and 300 is cancelled.

The turn-on time of the first switch 180, calculated starting from the turn-on moment, is preferably controlled on the primary circuit according to the drain peak voltage of the first switch 180 itself, to ensure minimum reactive energy in the system.

The turn-on time of the second switch 300 is instead preferably calculated so as to guarantee a delay with respect to the moment in which the first switch 180 turns off, so as to effectively regulate the output voltage on the electrical load 110.

The operation of this circuit can be characterised by electric currents $I_D$ in the active switch 180 which reach their maximum value precisely at the moment when the same active switch 180 turns off.

In the transition between on and off, a change in the resistance of the active switch 180 occurs in a finite time.

Considering the case of fast active switches, for example N-type MOSFETs, the suitably driven switch passes from on to off in a time of ns, tens of ns or hundreds of ns.

During this finite transient time, the resistance of the active switch 180 progressively increases and, at the same time, the current proportionately decreases, causing a dissipation peak which is not mitigated by the ZVS transition condition.

Figure 9:
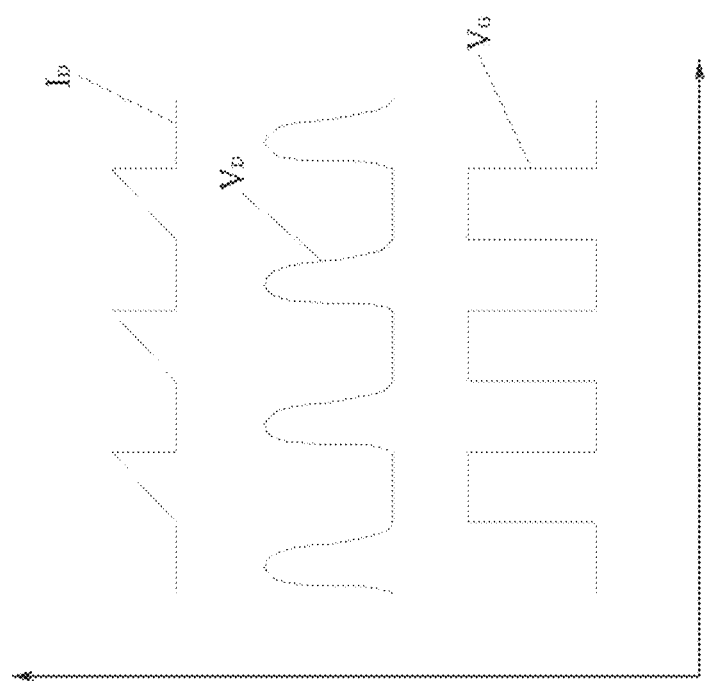
FIG. 9 is a graph showing a possible shape of the voltage and current wave that can be obtained at the first intermediate electrical node of the converter according to FIG. 8 according to the driving signal.

To reduce this dissipation peak it is possible to modify the converter 145 as shown in FIG. 9, i.e. by introducing a third resonance inductor 280, preferably having a small inductance value, which is arranged along the electric branch 225 that connects the intermediate electrical node 202 to the first terminal 221 of the first resonance capacitance 220.

In this way, the third resonance inductor 280 is arranged in the primary circuit in series with the first resonance capacitance 220.

This third resonance inductor 280 enters the calculation of the overall resonance frequency of the circuit, leaving the total inductance of the circuit unchanged. In other words, for a given resonance frequency of the circuit, if the inductance value of the third resonance inductor 280 is increased, the inductance values of the first and/or of the second resonance inductors 215 and/or 235 are correspondingly decreased, maintaining the dimensions roughly constant.

The advantage given by the third resonance inductor 280 consists in the introduction of a further resonance harmonic of the circuit with a higher frequency than the fundamental one, which involves voltage oscillations $V_D$ at the intermediate electrical node 202, and thus on the first terminal 185 of the active switch 180 (e.g. the MOSFET drain), during the turn-off time.

This additional harmonic also involves oscillations in the current $I_D$ which runs through the active switch 180, during the turn-on time.

The possible trends of the voltage $V_D$ and the current $I_D$, depending on the driving signal $V_G$, are illustrated in FIG. 9.

The oscillations of the voltage $V_D$ are useful for at least slightly increasing the power transferred to the electrical load 110, since, being at a higher frequency than the fundamental frequency, they pass the capacitive barrier which acts as a high-pass filter more easily.

The oscillations of the current $I_D$ during the turn-on time of the active switch 180 can instead be extremely useful for reducing the dynamic losses during the turn-on phase.

In fact, if the third resonance inductor 280 is chosen so that the oscillation period of the current $I_D$ is a sub-multiple of the turn-on period of the switch 180, it is possible to minimise the instantaneous turn-off current, thus bringing the circuit into conditions close to Zero Current Switching or in any case with strongly reduced currents.

Figure 8:
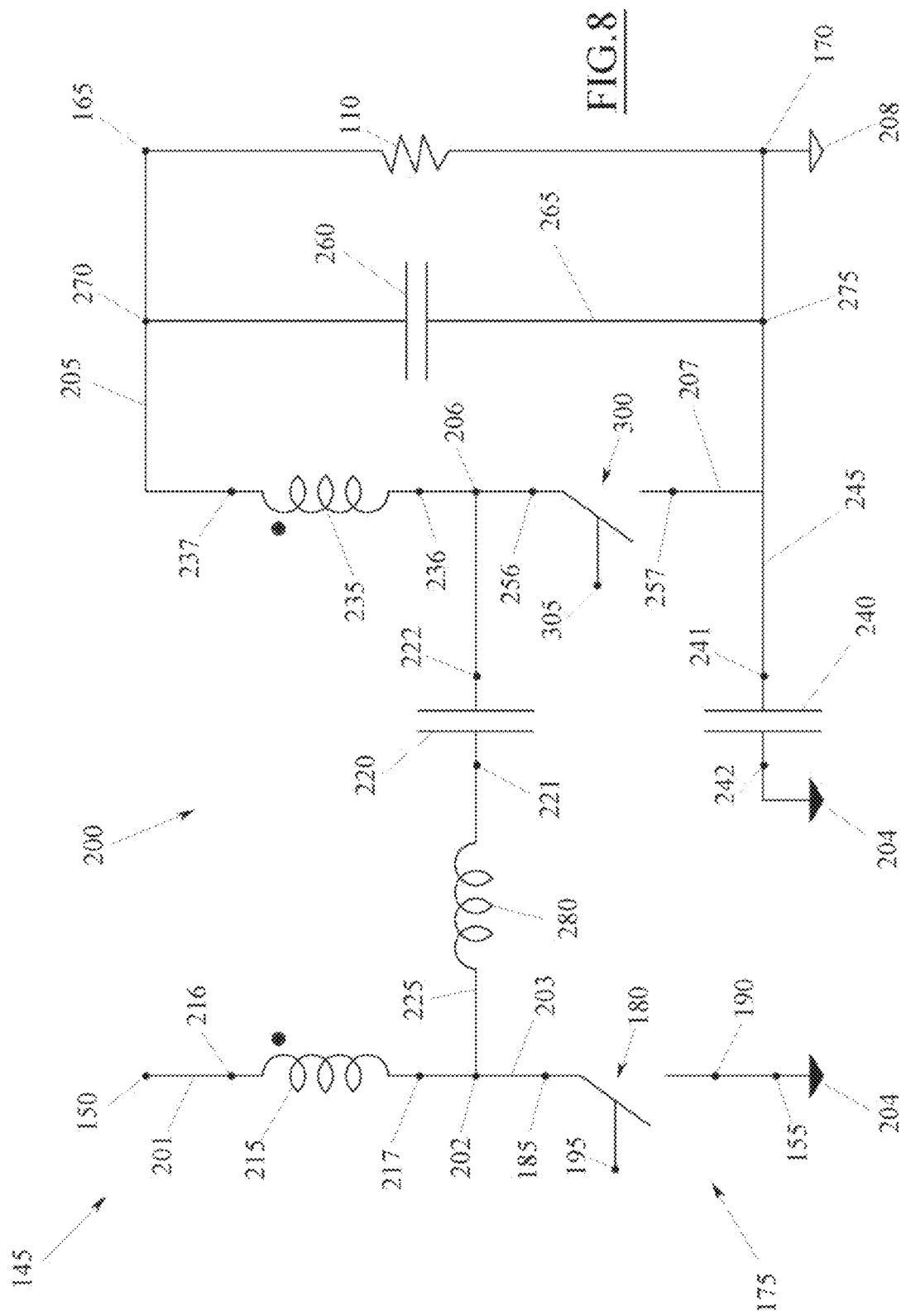
FIG. 8 is the electrical diagram of a converter that can be used in the system of FIG. 1, according to a third variant of the present invention.

It should be observed that, although FIG. 8 shows the third resonance inductor 280 in the case wherein the converter 145 is galvanically isolated and wherein the rectification stage is obtained by means of the second active switch 300, it is not excluded that the third resonance inductor 280 can also be used in the non-isolated case of FIG. 3 and/or in the case of rectification by means of a simple diode.

A further development of the circuits described above is illustrated in FIG. 10 and provides that the converter 145 can further comprise a first tank capacitance 285 in parallel with the active switch 180, for example having a first terminal 286 connected with the first intermediate electrical node 202 and a second terminal 187 connected with the second input terminal 155, or connected with the primary circuit reference voltage 204.

Additionally or alternatively, the converter 145 can comprise a second tank capacitance 290 in parallel with the third electric branch 207, or in parallel with the diode 255 or with the second active switch 300, for example having a first terminal 291 connected to the second intermediate electrical node 206, and a second terminal 292 connected to the second output terminal 170.

The tank capacitances 285 and/or 290 can help to achieve the tuning of the circuit and minimise the voltage derivative in the moment of turning on the active switch 180, guaranteeing lower dynamic turn-on losses linked to sharp variations in current.

Moreover, these tank capacitances 285 and/or 290 have a positive effect, as they are able to make the circuit more insensitive with respect to the tolerances of the switches and components and in particular with respect to the eddy capacitances of switches and inductances.

Furthermore, the tank capacitances 285 and/or 290 lower the resonance frequency of the circuit.

Finally, the tank capacitances 285 and/or 290 can be connected through additional switches in series only under certain voltage or power conditions (e.g. in conditions of high input voltage and low power transferred to the load) to simply reduce the power transferred to the load.

Figure 10:
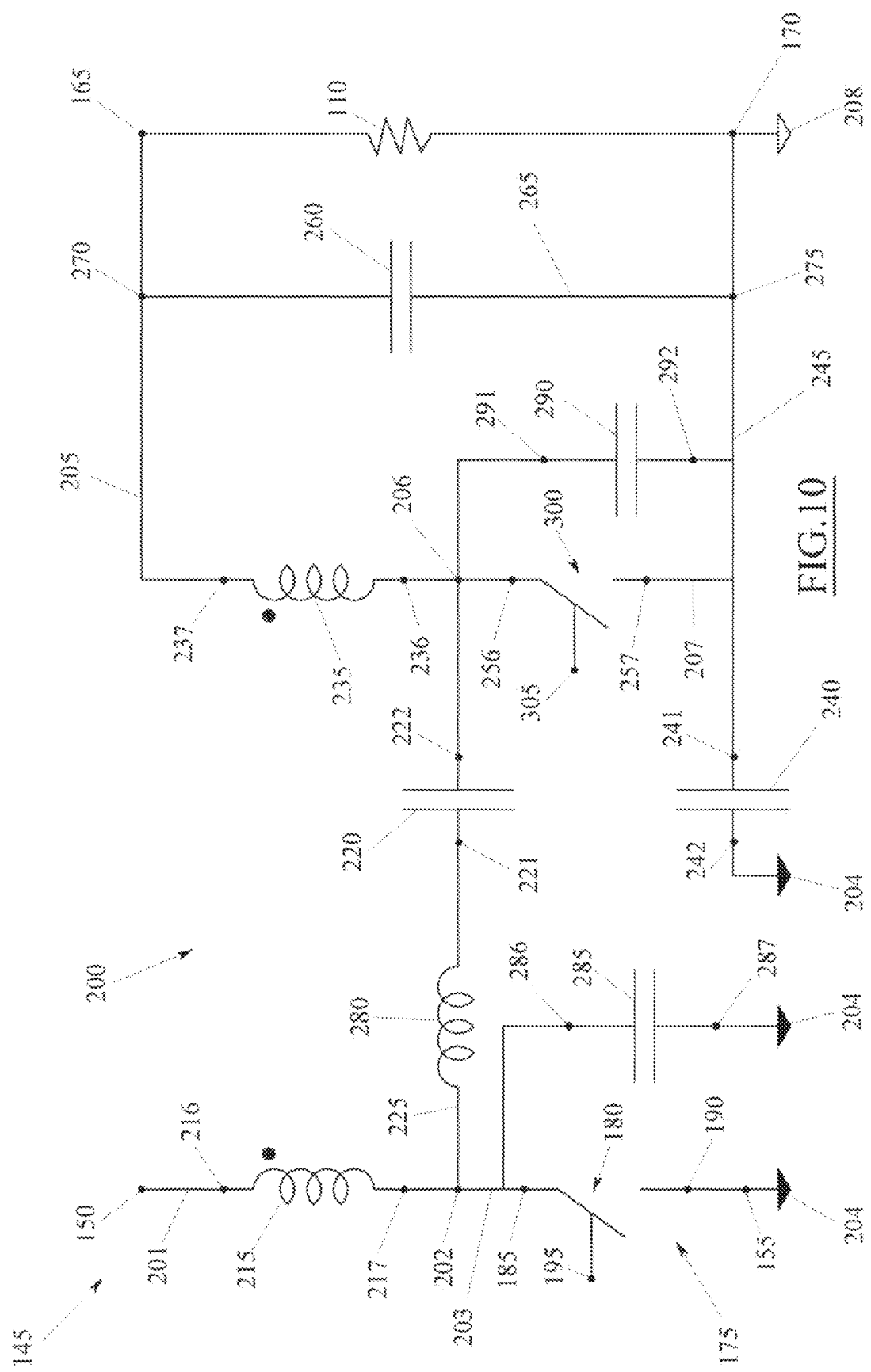
FIG. 10 is the electrical diagram of a converter that can be used in the system of FIG. 1, according to a fourth variant of the present invention.

Also in this case, although FIG. 10 shows the tank capacitances 285 and 290 in the case wherein the converter 145 is galvanically isolated and wherein the rectification stage is obtained by means of the second active switch 300, it is not excluded that the same tank capacitances 285 and/or 290 can also be used in the non-isolated case of FIG. 3 and/or in the case of rectification by means of a simple diode.

To increase the power transferred to the electrical load 110, all the variants of the converter 145 described above can be made in a multiphase configuration without significant conceptual variations.

In practice it is possible to connect a further wave generator circuit, substantially analogous to the wave generator 175, to the second terminal 242 of the second resonance capacitance 240.

The active switches 180 of the two wave generators 175 can be controlled by respective driving signals, so as to turn on and off with the same frequency but not in phase with one another, i.e. so that the active switches 180 are not always turned on or off at the same time but there is always at least a small amount of time, within each operating period, in which an active switch 180 is on while the other active switch 180 is off and vice versa.

In this way, by appropriately adjusting this time span, i.e. the phase shift between the driving signals of the two active switches 180, it is advantageously possible to increase the power transmitted to the electrical load 110 with the same supply voltage.

If the power level to be transferred to the electrical load 110 is particularly high, it is also possible to control the two active switches 180 with counter-phased driving signals between the two, so that when an active switch 180 is on, the other is constantly off and vice versa, obtaining a push-pull type of operation.

Finally, it should be pointed out that in all the illustrated embodiments, the two resonance capacitances 220 and 240 can be discrete capacitances, i.e. of inseparable components comprising a first terminal connected to the primary circuit and a second terminal connected to the secondary circuit.

In this way, the system 100 can be made in the form of a unique and inseparable device, such as an isolated electric power supply.

In other embodiments, each resonance capacitance 220 and 240 could however be made by a pair of mutually separable armatures, of which a transmission armature connected to the primary circuit and a receiving armature connected to the secondary circuit.

At the same time, the resonance inductors 215 and 235, inductively coupled together, could be respectively constituted by a coil (e.g. an antenna) for wireless transmission and by a coil (e.g. antenna) for wireless reception of the electric power.

In this way, the primary circuit of the converter 145 can be installed in a first device, while the secondary circuit can be installed on a second device, physically separate and mobile (removable) with respect to the first device, making a wireless hybrid capacitive and inductive electric power transmission system.

For example, the first device could be configured as a recharging base while the second device could be a device to be recharged or powered, such as a smartphone, laptop, television and much more.

In this way, by suitably bringing the second device close to the first device, it is possible to approach and face each transmission armature to a corresponding receiving armature, reconstituting the resonance capacitances 220 and 240, as well as bringing the resonance inductors 215 and 235 closer together, reconstituting the inductive coupling.

Figure 11:
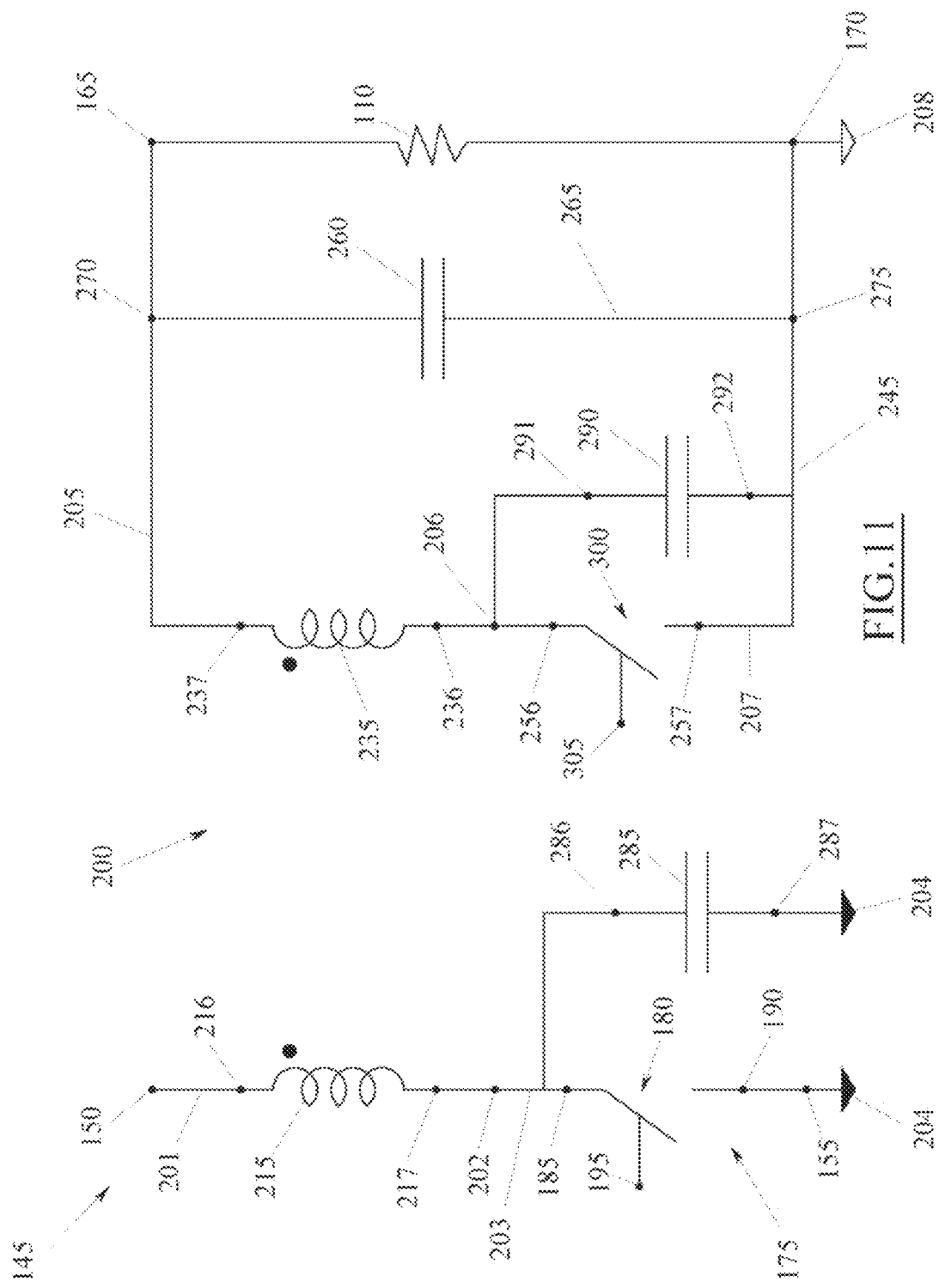
FIG. 11 is the electrical diagram of a converter that can be used in the system of FIG. 1, according to a fifth variant of the present invention.

A further embodiment of the present solution is illustrated in FIG. 11.

This embodiment differs from that shown in FIG. 10, only in that the resonance capacitances 220 and 240 have been eliminated, correspondingly eliminating the entire connection branch between the first intermediate electrical node 202 and the second intermediate electrical node 206, and in that the first tank capacitance 285 and/or the tank capacitance 290 are also used as resonance capacitances.

In this way, the transfer of electrical energy between the primary circuit and the secondary circuit takes place only inductively, through the mutual inductive coupling between the first resonance inductance 215 and the second resonance inductance 235.

Although this layout resembles a classic transformer-based converter, it actually differs from the known technique for the low value of the coupling factor K between the first resonance inductor 215 and the second resonance inductor 235, as well as for the presence of the resonance/tank capacitance 285 and/or 290.

It has been found that the converter 145 according to this last embodiment, although transferring less energy, works equally with waveforms similar to those obtainable with the previous circuits, reaching high levels of efficiency and compact dimensions.

Naturally this embodiment does not necessarily require the presence of both resonance/tank capacitances 285 and 290, as the presence of even just one of them is sufficient.

Obviously, an expert in the field can make several technical-applicative modifications without departing from the scope of the invention as hereinbelow claimed.

The invention claimed is:

1. A converter for transferring electric power to an electrical load, comprising:
    a first input terminal and a second input terminal, between which a direct electric voltage or an electric voltage similar to a direct electric voltage is applied,
    a first output terminal and a second output terminal connectable to opposite ends of the electrical load,
    a first electric branch adapted to connect the first input terminal with a first intermediate electrical node,
    a second electric branch adapted to connect the first intermediate electrical node with the second input terminal, a third electric branch adapted to connect the first output terminal with a second intermediate electrical node, a fourth electric branch adapted to connect the second intermediate electrical node with the second output terminal, a first active switch placed on the second electric branch and having a first conduction terminal connected to the first intermediate electrical node, a second conduction terminal connected with the second input terminal, and a control terminal adapted to receive an electric driving signal to switch the first active switch between a saturation condition, wherein the first active switch allows a passage of electric current between the first and the second conduction terminals, and a cut-off condition, wherein the first active switch prevents said passage of electric current, and a resonant circuit sized to reduce an electric voltage and/or an electric current applied to said first active switch at least in the moments wherein said first active switch switches from the cut-off condition to the saturation condition, wherein said resonant circuit comprises at least:

a first resonance inductor placed on the first electric branch and having a first terminal connected to the first input terminal and a second terminal connected to the first intermediate electrical node, a second resonance inductor placed on the third electric branch and having a first terminal connected to the second intermediate electrical node and a second terminal connected to the first output terminal, and a first resonance capacitance comprising a first terminal connected to the first intermediate electrical node and a second terminal connected to the second intermediate electrical node, wherein the first resonance inductor and the second resonance inductor are inductively coupled together with a reciprocal coupling factor less than 1, and in that the fourth electric branch comprises a diode or a second active switch, wherein the diode has a cathode that is connected with the second intermediate electrical node and an anode that is connected with the second output terminal, wherein the second active switch has a first conduction terminal connected to the second intermediate electrical node, a second conduction terminal connected to the second output terminal, and a control terminal adapted to receive an electric driving signal to switch the second active switch between a saturation condition, wherein the second active switch allows the passage of electric current between the first and the second conduction terminals, and a cut-off condition, wherein the second active switch prevents said passage of electric current.

2. A converter according to claim 1, wherein the coupling factor between the first resonance inductor and the second resonance inductor is comprised between 0.1 and 0.8.

3. A converter according to claim 2, wherein the coupling factor between the first resonance inductor and the second resonance inductor is comprised between 0.2 and 0.6.

4. A converter according to claim 1, further comprising a second resonance capacitance having a first terminal connected to the second output terminal and a second terminal connected to the second input terminal.

5. A converter according claim 1, further comprising a first controller configured to turn on and off the first active switch in a periodic manner, wherein said first controller is configured to measure an electric voltage applied to the first conduction terminal of the first active switch and to turn on said first active switch when a measured volt-age is zero.

6. A converter according to claim 1, further comprising a second controller configured to turn on and off the second active switch in a periodic manner, wherein said second controller is configured to measure the electric voltage applied to the first conduction terminal of the second active switch and to turn on said second active switch when the measured voltage is zero.

7. A converter according to claim 6, wherein the second controller is configured to keep the second active switch on for a turning-on time that is shorter than a duration of a period, turning it off at a moment when the first controller turns off the first active switch or with a certain delay.

8. A converter according to claim 7, wherein the second controller is configured to measure a value of an electric voltage applied to the first output terminal and to vary the delay in turning off the second active switch so as to minimize a difference between the measured value and a desired value of said electric voltage.

9. A converter according to claim 6, wherein the first controller is configured to measure a peak value of an electric voltage applied to the first conduction terminal of the first active switch and to vary a turning-on time of the first active switch so as to minimize a difference between the measured value and a desired value of said electric voltage peak.

10. A converter according to claim 1, further comprising a third resonance inductor arranged along an electric branch which connects the first intermediate electrical node to the first terminal of the first resonance capacitance.

11. A converter according to claim 1, further comprising a tank capacitance connected in parallel to the diode or to the second active switch.

12. A converter according to claim 1, further comprising a tank capacitance connected in parallel to the first active switch.

* * * * *